United States Patent [19]
Maeda

[11] Patent Number: 5,432,761
[45] Date of Patent: Jul. 11, 1995

[54] METHOD AND APPARATUS FOR MAGNETO-OPTICAL RECORDING OF A PLURALITY OF DISCRETE LEVELS

[75] Inventor: Atsushi Maeda, Ibaraki, Japan

[73] Assignees: Research Development Corp. of Japan, Tokyo; Sanyo Electric Co., Ltd., Osaka, both of Japan

[21] Appl. No.: 169,744

[22] Filed: Dec. 17, 1993

Related U.S. Application Data

[63] Continuation of Ser. No. 741,863, Aug. 8, 1991, abandoned.

[30] Foreign Application Priority Data

Aug. 10, 1990 [JP] Japan ................................ 2-210410

[51] Int. Cl.$^6$ .............................................. G11B 13/04
[52] U.S. Cl. ........................................ 369/13; 360/59
[58] Field of Search ................................ 369/13, 14, 110; 300/59, 114; 365/122; 428/694 ML, 694 MM, 694 RE

[56] References Cited

U.S. PATENT DOCUMENTS

| | | | |
|---|---|---|---|
| 4,576,699 | 3/1986 | Sato et al. | 428/694 RE |
| 4,862,437 | 8/1989 | Okada | 369/13 |
| 4,922,454 | 5/1990 | Taki | 365/122 |

FOREIGN PATENT DOCUMENTS

| | | |
|---|---|---|
| 210855 | 2/1987 | European Pat. Off. |
| 369815 | 5/1990 | European Pat. Off. |
| 2560419 | 2/1984 | France |

OTHER PUBLICATIONS

Salamon et al., Phys. Rev. Lett. 56, 259 (1986).
Majkrzak et al., J. Appl. Phys. 63, 3447 (1988).

Primary Examiner—Georgia Y. Epps
Assistant Examiner—Tan Dinh
Attorney, Agent, or Firm—Darby & Darby

[57] ABSTRACT

The invention provides a medium and a method suitable for magneto-optical and multiple recording.

The medium includes alternate thin layers of a magnetic rare-earth metal and an electrically conductive material, and has "magnetic frozen state" at low temperature. The medium may be magnetized to different ferromagnetic states when heated to different temperatures by a controlled laser beam, under an external magnetic field. The different magnetic states permit of multiple recording.

8 Claims, 14 Drawing Sheets

KERR ROTATIONAL ANGLES

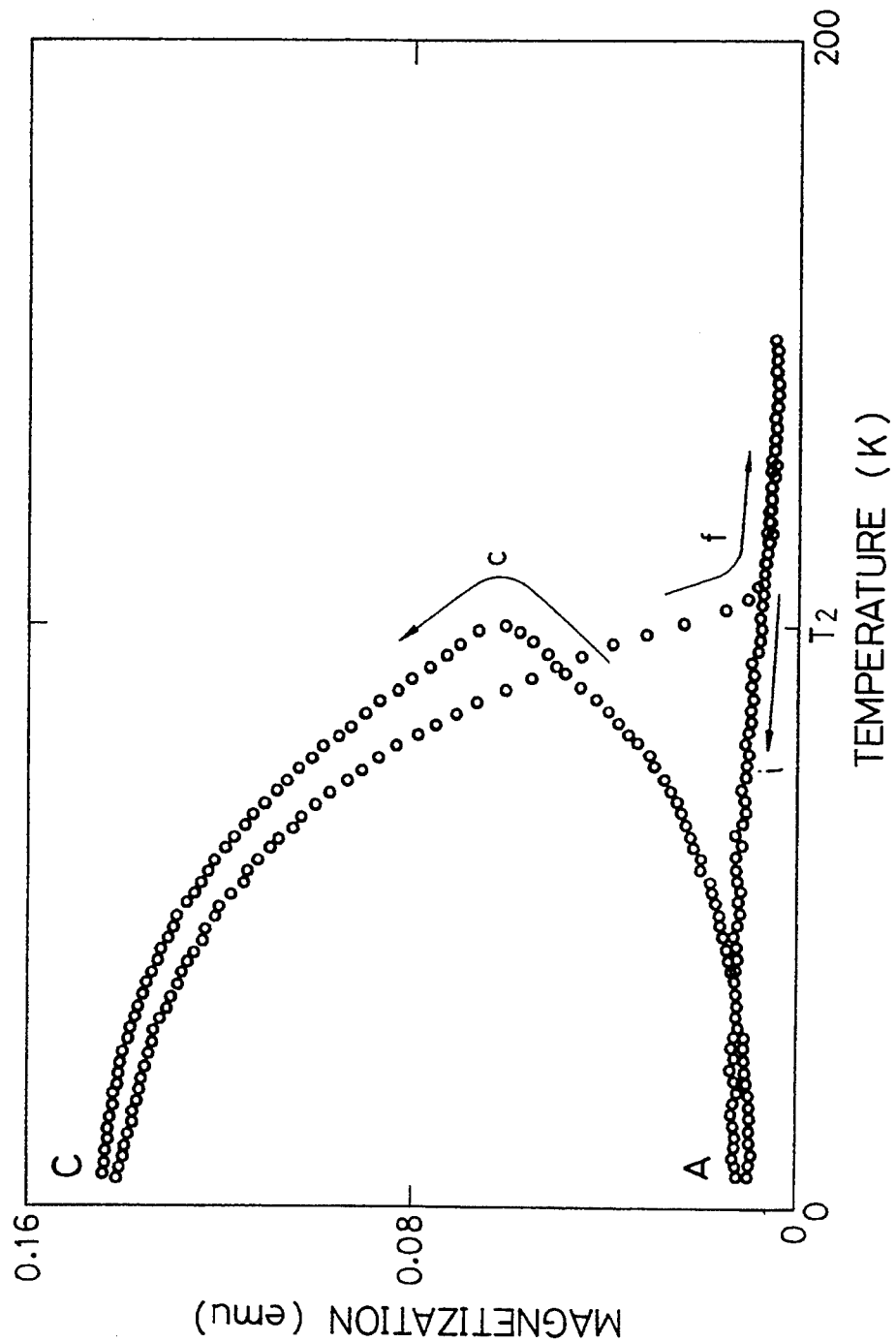

FIG. 12 A
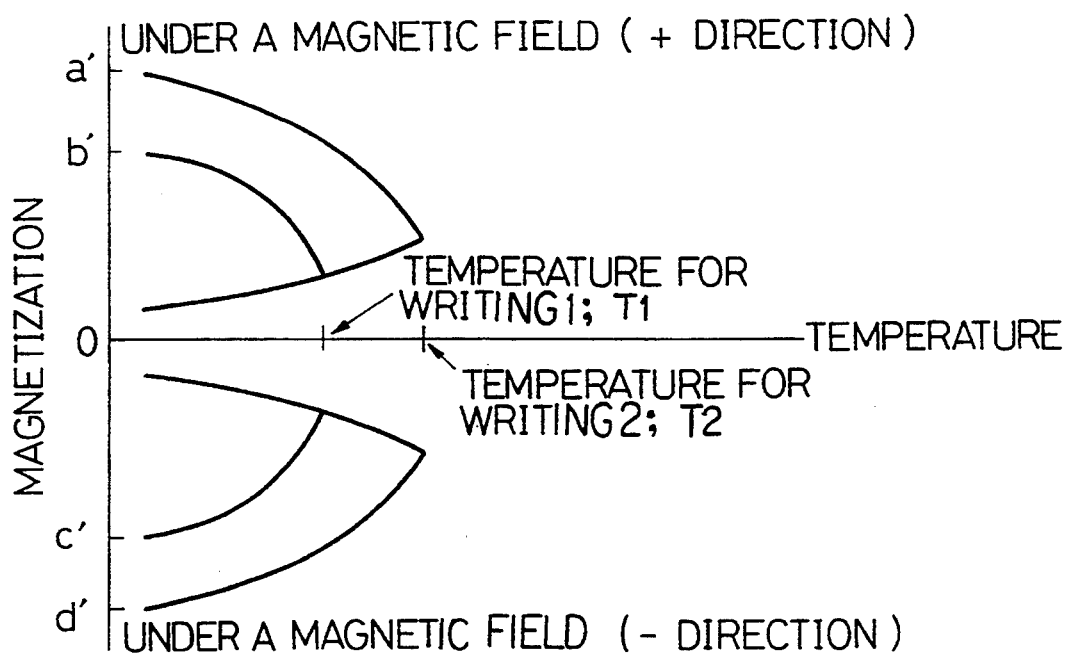
FIG. 12 B
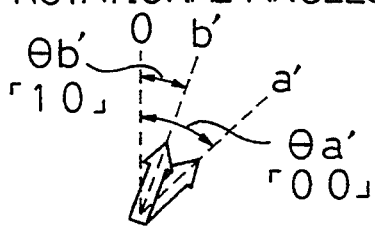
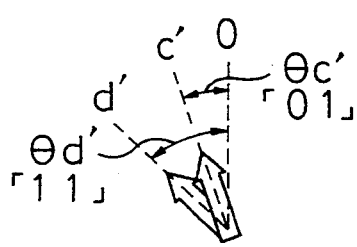

METHOD AND APPARATUS FOR MAGNETO-OPTICAL RECORDING OF A PLURALITY OF DISCRETE LEVELS

This is a continuation of application Ser. No. 07/741,863, filed Aug. 8, 1991 and now abandoned.

FIELD OF THE INVENTION

The invention relates to a method and a material for magneto-optical recording. More particularly, the invention relates to a recordable and erasable magneto-optical medium and the recording method therefor.

BACKGROUND OF THE INVENTION

A well known method for magnetic recording on a magnetic medium resorts to localized irradiation of light on a region of the magnetic recording medium placed in a magnetic field to thereby provide heat energy which changes the magnetic state of the region. This method has been known to provide high density recording.

However, most of the materials for use in such magneto-optical recording as mentioned above are ferromagnetic, so that, due to their internal magnetic effect, magnetic spins are oriented in the direction parallel to the surface of the medium, resulting in a recording density much less than the recording density that would be obtained by perpendicular recording.

Another disadvantage of such prior art is that multiple recording is not possible since the magnetization of the medium is dichotomic, i.e. it has only two magnetic states, corresponding to digital states 1 and 0. Further, it is necessary to use a high-power laser in the prior art recording/erasing to heat the medium, since the medium must be heated above the Curie temperature.

The only existing material available for so-called perpendicular magnetization for use in magneto-optical recording is TbFeCo alloy. The alloy is, however, not only expensive but also very susceptible to external magnetic fields and oxidation.

BRIEF SUMMARY OF THE INVENTION

It is therefore an object of the invention to provide a new magneto-optical medium having a high resistance against external magnetic field.

It is another object of the invention to provide a medium and a method therefor suitable for perpendicular recording/erasing.

It is a further object of the invention to provide a medium and a method therefor for multiple recording/erasing.

The invention utilizes a multi-layer magnetic medium 20 as shown in FIG. 1, which is obtained by depositing on a base 10 alternate layers of a magnetic rare-earth metal 11 and an electrically conductive material 12. Each layer ranges in thickness from several 10 Å to several 100 Å. Such multi-layer medium has spin-reorientation characteristic from the "magnetic frozen state" to ferromagnetic state, which arises from the inter-layer magnetic interaction between the rare-earth metal layers with the mediation of conduction electrons.

In one mode of the invention, a magneto-optical recording medium is a thin film of alternate layers of a magnetic rare-earth metal and an electrically conductive material, which, when heated to a certain arbitrarily selected temperature in a given temperature region needed for magneto-optical recording/erasing, may be magnetized to a corresponding arbitrary degree of magnetization.

In another mode of the invention, a method is provided for recording the magneto-optical recording medium, said method comprising a step of irradiating said medium with a laser beam under a magnetic field to thereby heat said medium to said certain arbitrary temperature while recording information, and a step of cooling said irradiated medium to its initial temperature under a magnetic field.

In a further mode of the invention, a method is provided for erasing the magneto-optical recording medium, said method comprising a step of irradiating said medium with a laser beam without magnetic field to heat said medium to a temperature higher than the temperature used in recording, and a step of cooling said irradiated medium to its initial temperature under zero magnetic field.

In a still further mode of the invention, a method is provided for multiply recording/erasing information on the magneto-optical recording medium of the invention, comprising steps of irradiating said medium with a laser beam of varying intensity to heat said medium in a controlled manner for multiple degrees of magnetization.

The term "magnetic frozen state" refers to a state of the medium in which magnetic spins are kept oriented in random directions. Consequently, as the medium is heated in a magnetic field of an arbitrary intensity, the magnetization increases from its initial magnetization MA at the initial temperature TA to a maximum magnetization at a certain temperature (which will be hereinafter called "peak temperature"), as shown in FIG. 2. The magnetization will thereafter be diminished with the increase of temperature. This characteristic phenomenon, which we call "magnetic freezing", was first found in 1985. (See Physical Review Letters, 56, 259 (1986).) Much study has been made since then on this phenomenon primarily for physical interest. The phenomenon, however, is not fully understood yet: a fundamental problems as to if the phenomenon is attributable to a phase transition as in the case of other magnetic order-disorder cooperative phenomena, still remains unanswered. Nevertheless, the magnetic freezing may be utilized for magneto-optical recording in accordance with the invention, as described in detail below.

No use of the magnetic freezing property has been reported in connection with magneto-optical recording. It may be mainly due to the fact that the phenomenon has been taken for granted as being reversible. The inventor, however, found after elaborate study of the magnetic freezing phenomenon that it is irreversible under certain conditions. That is, if such a magnetic medium as mentioned above is heated under a magnetic field from an initial temperature TA to an arbitrary temperature TB, it retains magnetization MB even after it is cooled to the initial temperature TA and the magnetic field is removed (along the path indicated by arrow A in FIG. 2). This is due to temporary "melting" of the frozen magnetic spins caused by the heating and subsequent reorientation of the spins under a magnetic field to produce ferromagnetism. If the material is heated (along the path B) again without magnetic field, the magnetization reduces approximately to its initial level MA at temperature TB, and back to the very initial magnetization MA if the temperature is reduced thereafter to the initial temperature TA (Path C indicated by arrow C).

As briefly discussed above, it is possible to produce a state of an arbitrary degree of magnetization by controlling the heating temperature under magnetic field, and this enables multiple recording. The principle behind this multiple recording will be described in detail later. Also, it should be noted that data writing and data erasing is possible at a temperature arbitrarily selected within a certain temperature range by the use of a laser beam energy. Furthermore, such medium has a further important property that it favors perpendicular magnetization (i.e. magnetization in the direction perpendicular to the surface of the medium), which we call anisotropic perpendicular magnetization property. The invention utilizes these properties of the medium as means for high-density magneto-optical recording.

BRIEF DESCRIPTION OF THE DRAWINGS

FIGS. 5A-C shows some of reversible magneto-optical properties of a thin film of Dy(40 Å)/Yb(40 Å) (25 periods of Dy-Yb layers) for different temperatures.

FIGS. 12(A and B) shows the possible multiple magnetic states in the perpendicular magnetization according to the invention and their Kerr rotational angles.

DETAILED DESCRIPTION OF THE PREFERRED EMBODIMENT

Figure 1:
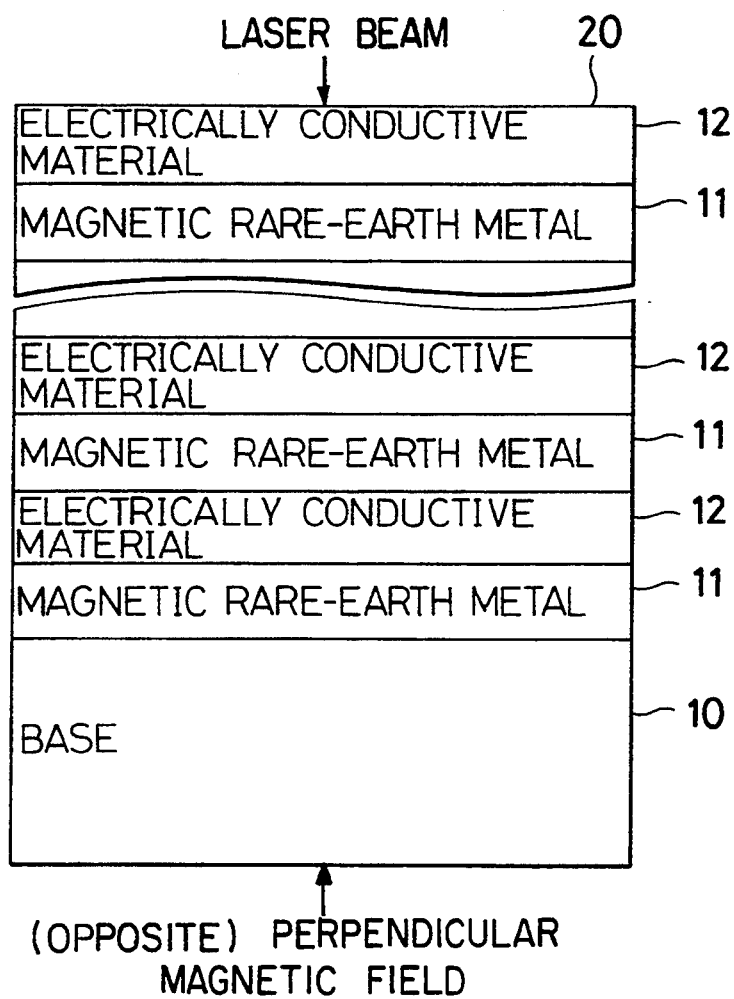
FIG. 1 is a cross section of a multi-layer thin film of a magnetic rare-earth metal and an electrically conductive material.
Figure 2:
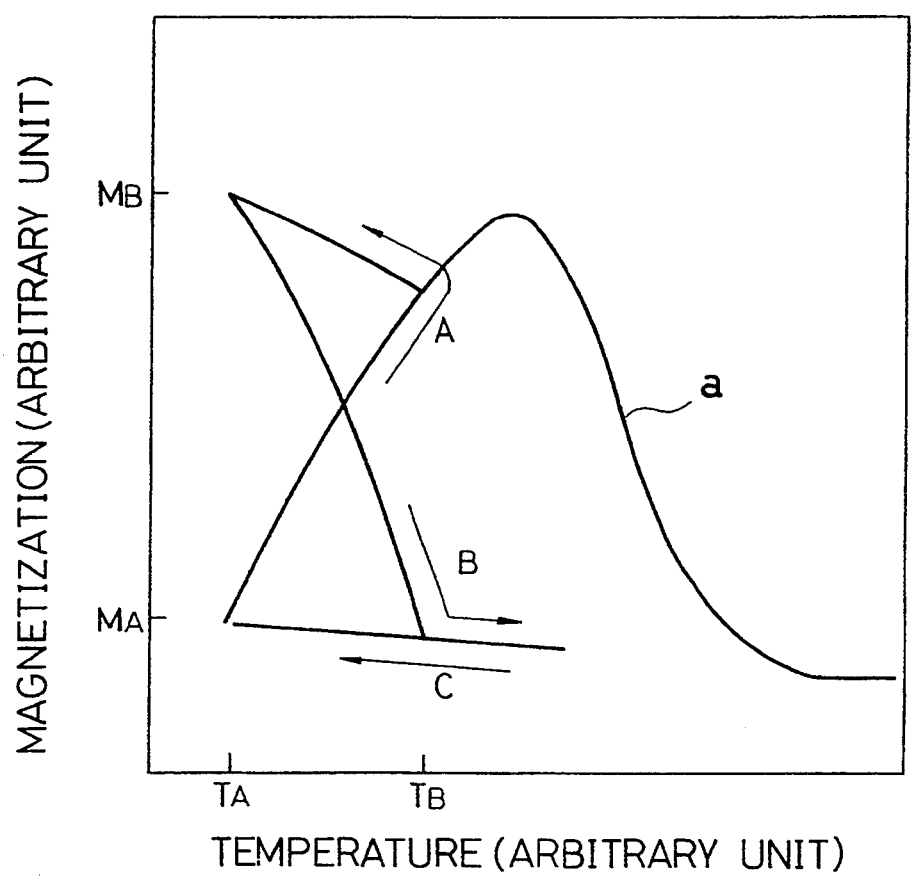
FIG. 2 illustrates the principle of the reversible magneto-optical recording.
Figure 3:
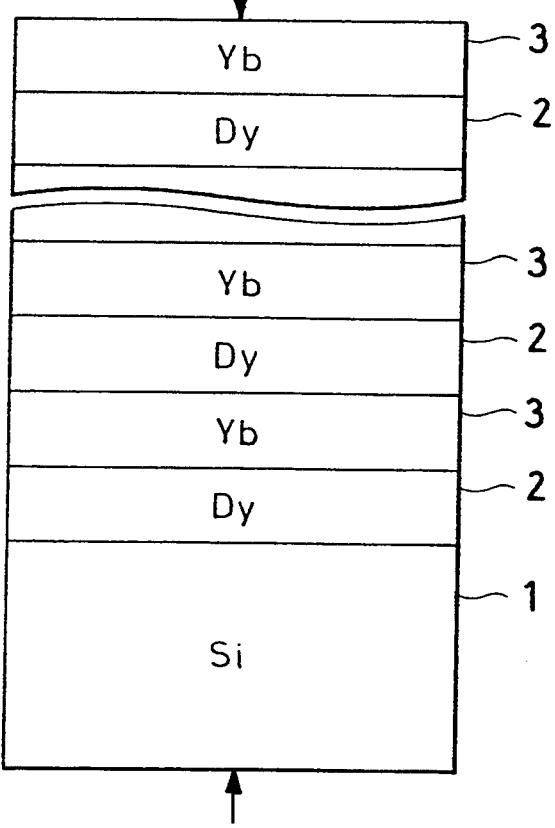
FIG. 3 is a schematic cross section of a Dy/Yb magneto-optical thin film according to the invention.
Figure 4:
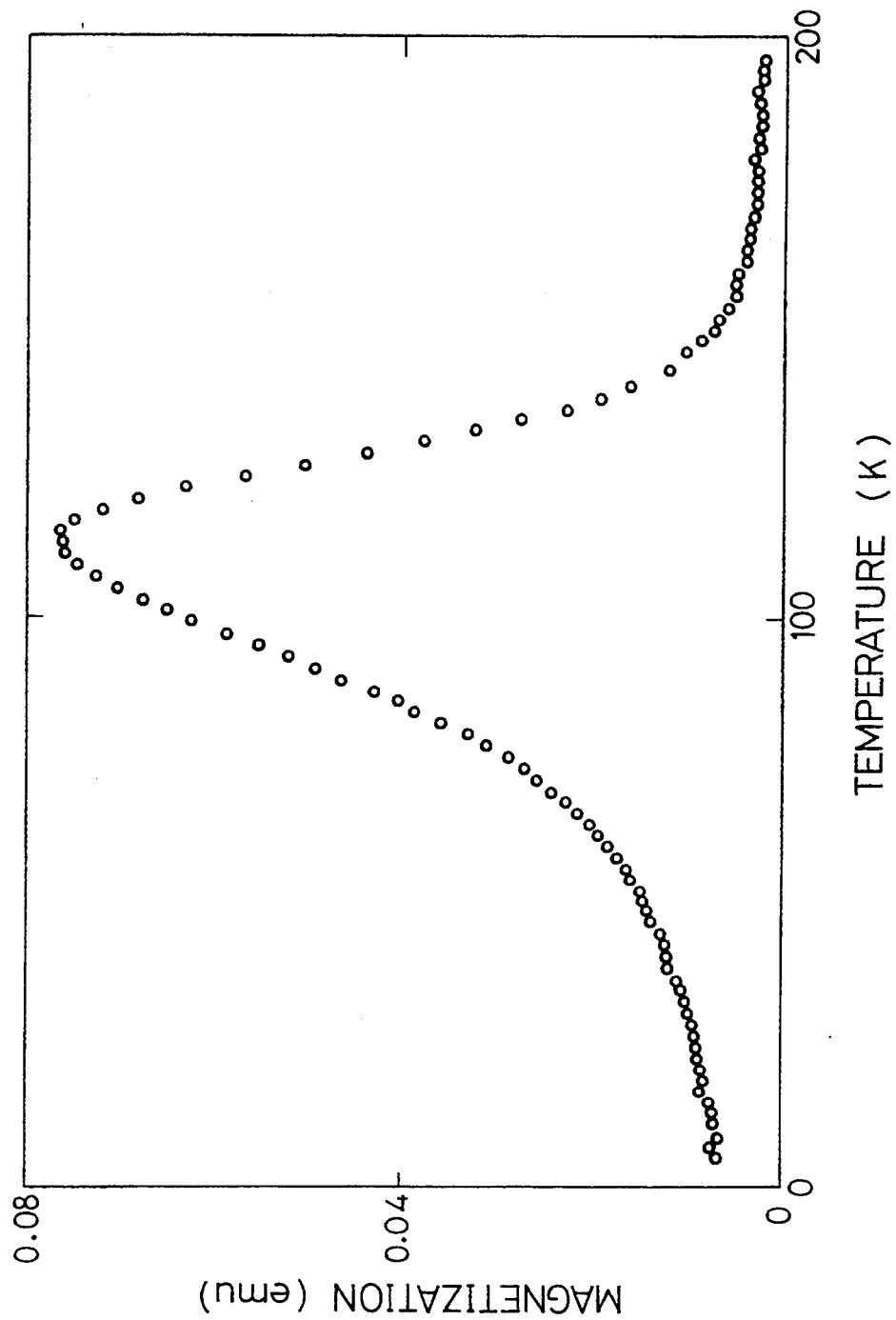
FIG. 4 illustrates a characteristic magnetization-temperature behavior observed for a thin film of Dy(40 Å)/Yb(40 Å) (25 periods of Dy-Yb layers), verifying the presence of magnetization freezing.
Figure 5A:
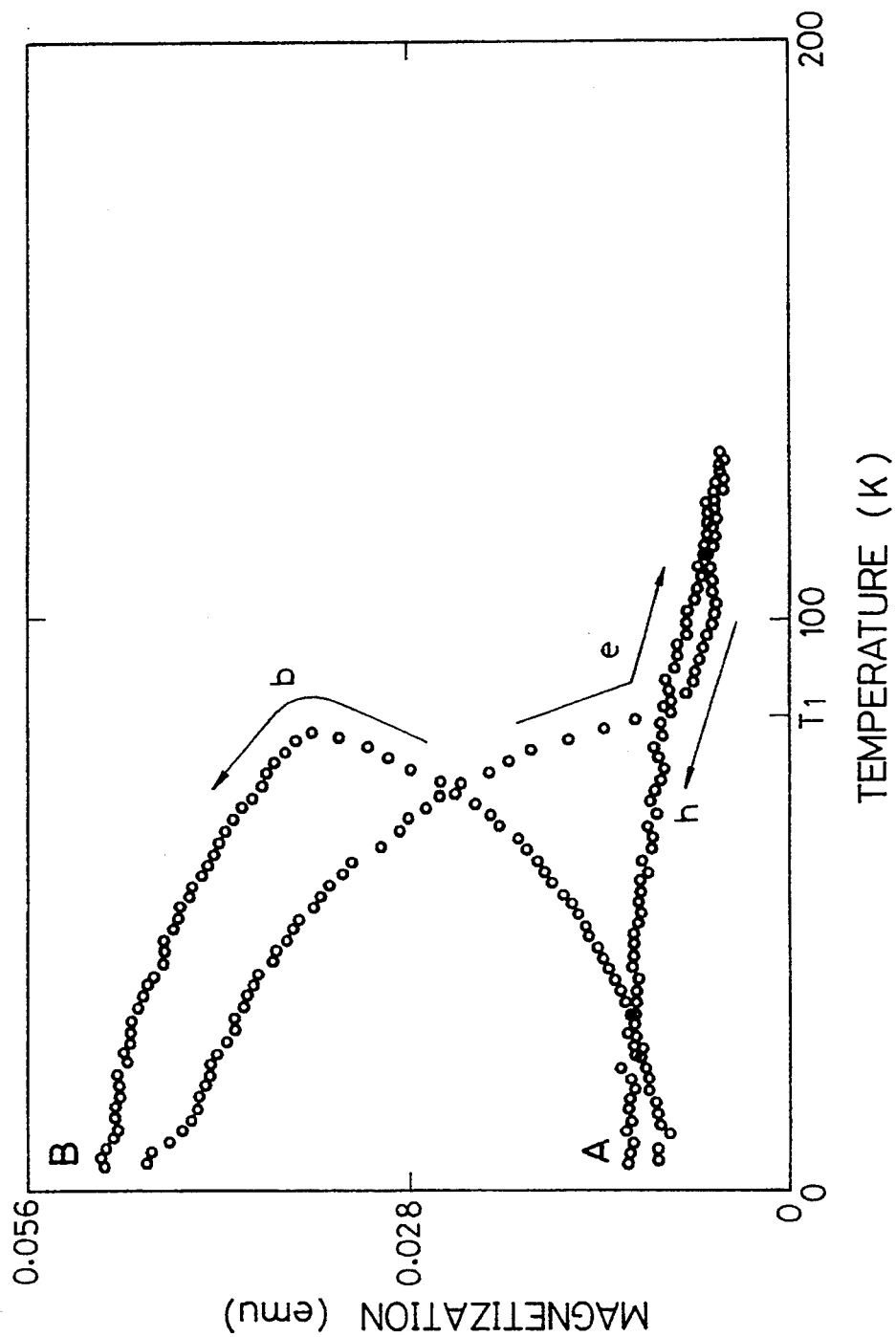
Figure 5C:
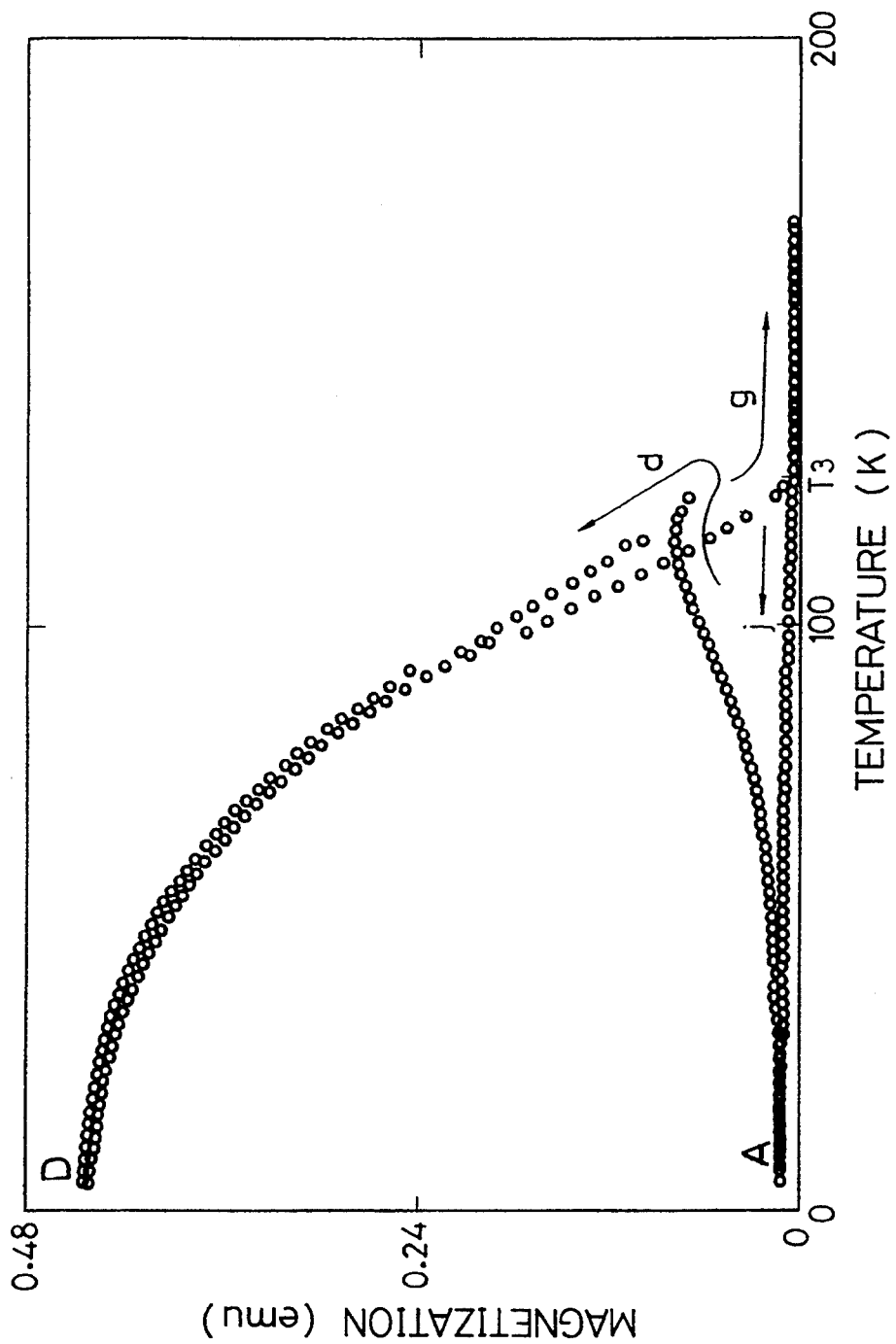

Referring now to FIG. 3, there is shown a multi-layer thin film formed on an silicon substrate. The thin film is formed of alternate layers 2 and 3 of Dy(Dysprosium) and Yb(Ytterbium), respectively by molecular beam deposition technique. FIG. 4 shows the magnetization as a function of temperature of such thin film which was once cooled without magnetic field and then heated to an observation temperature under 50 Gauss, the thin film exhibiting the magnetic freezing phenomenon. It has been found that the thin film has the anisotropic perpendicular magnetization. FIG. 5 shows the typical magnetic behaviors observed in the Dy-Yb thin films. The abscissa denotes absolute temperature, while the ordinate perpendicular component of the magnetization. Recording (magnetization) and erasing (demagnetization) were carried out under the following conditions.

Light source: Semiconductior laser
Wave length: 830 nm
Out put: 5~10 mw
beam diameter: 0.5 μm
heating period: 20 ns In this observation, the thin film which was cooled once to a state A without magnetic field is heated to a temperature (e.g. $T_1=80K$, $T_2=100K$, and $T_3=125K$) by irradiating the thin film with laser beam under 50 Gauss, and then cooled to its initial temperature under 50 Gauss. The magnetization of the thin film follows the paths b, c, and d in FIGS. 5 A, B, and C, respectively, and reaches the state B, C, and D, respectively.

Figure 6:
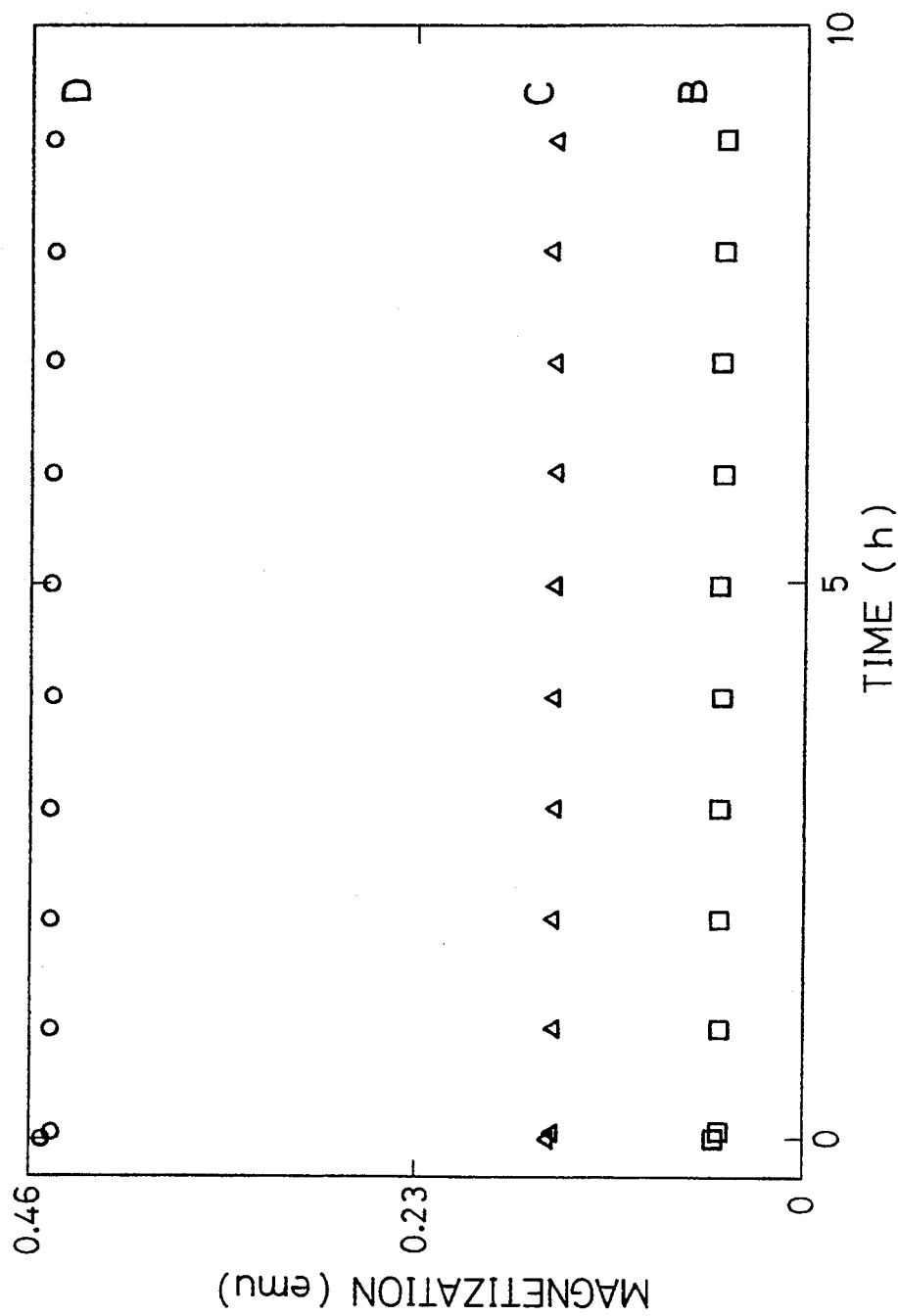
FIG. 6 shows a chronological change in magnetization of a thin film of Dy(40 Å)/Yb(40 Å) (25 periods of Dy-Yb layers) under zero magnetic field.

FIG. 6 shows change in magnetization of the thin film with time starting from the state B, C, and D, respectively, after the magnetic field is removed. As seen in the figure, the thin film maintains magnetization even after the removal of the magnetic field.

If the thin film is heated by laser beam without magnetic field, the magnetization varies as indicated by arrows e, f, and g of FIG. 5 A, B, and C, respectively, manifesting the property of the thin film that it loses its magnetization at 80K, 100K, and 125K, respectively. The thin film will restore its initial state A through a path indicated by arrows h, i, and j, respectively, as it is cooled to the initial temperature under Zero magnetic field.

In this manner it is possible to write/erase data into/out of the thin film by heating it with a laser beam to a temperature arbitrarily selected. Furthermore, since variable magnetization may be obtained by choosing the heating temperature, it is possible to attain multiple recording.

Figure 7:
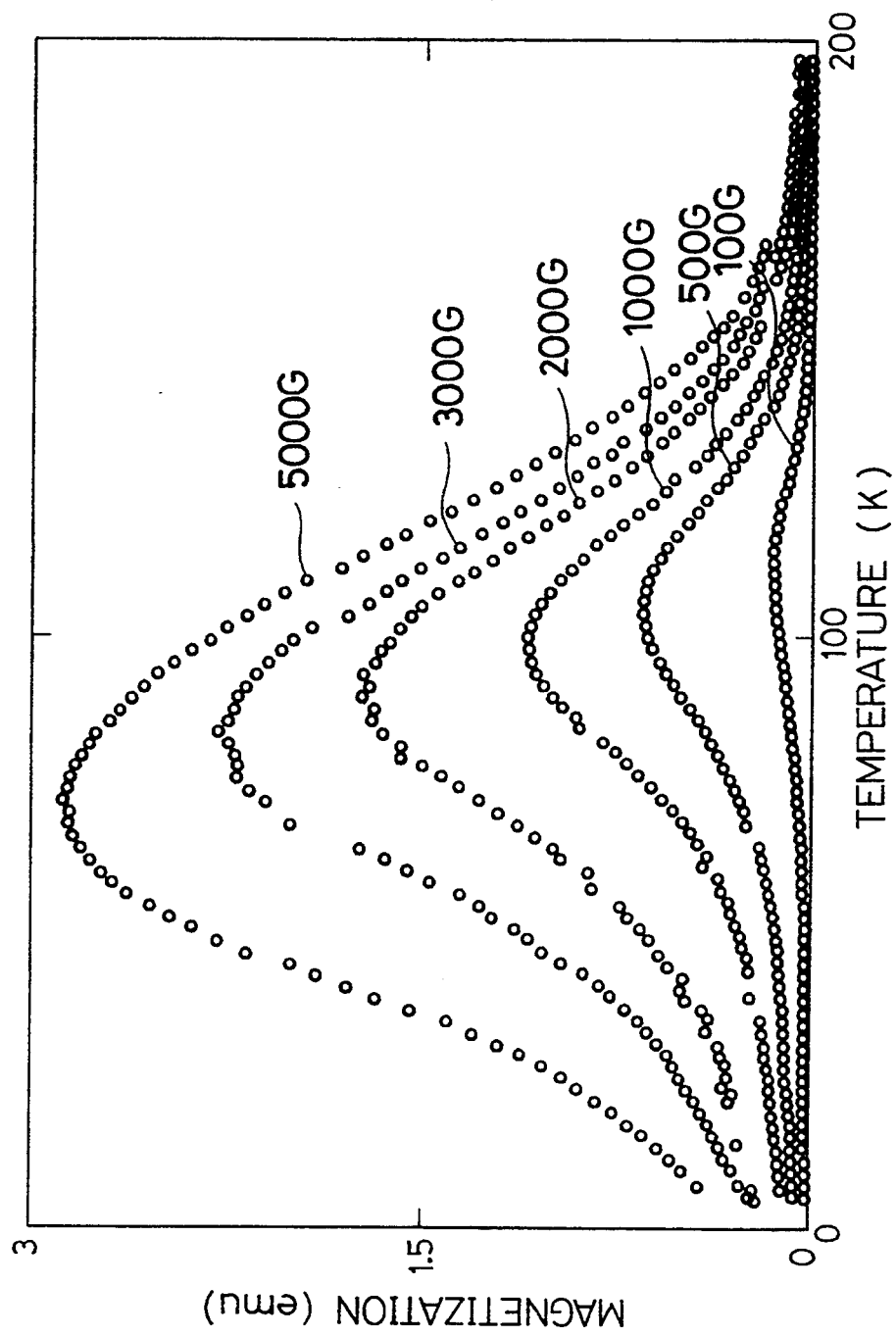
FIG. 7 shows the dependence of the magnetic freezing on magnetic field intensity applied for a thin film of Dy(40 Å)/Yb (40 Å) (25 periods of Dy-Yb layers).

The dependence of the magnetization of the thin film having magnetic freezing on temperature varies with the intensity of the magnetic field applied as shown in FIG. 7. The abscissa denotes the absolute temperature and the ordinate denotes the magnetization in the direction perpendicular to the surface of the thin Film. From this Figure, it is seen that magnetization freezing, which is favorable for magnetic recording, is enhanced by strong magnetic field.

Figure 8:
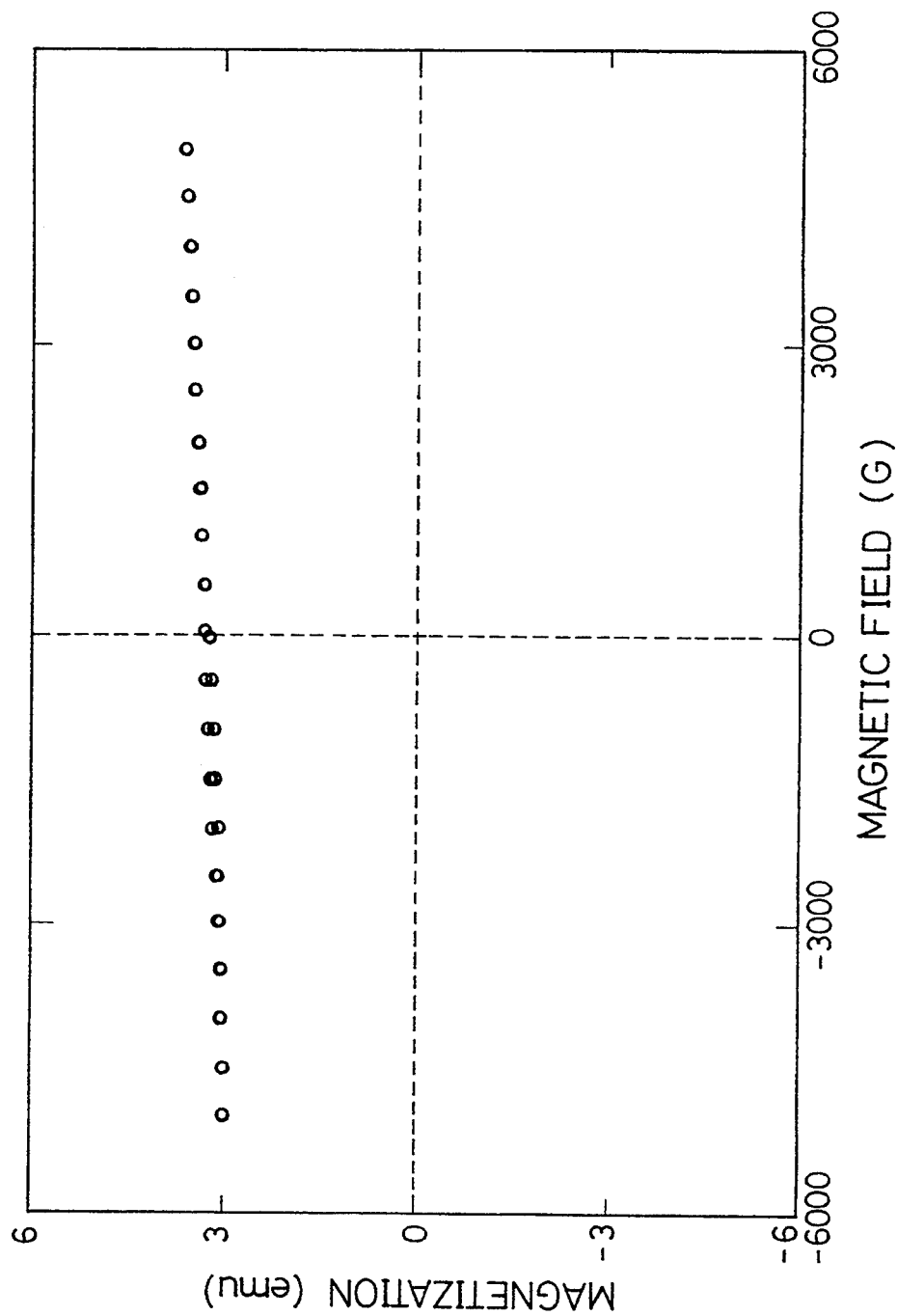
FIG. 8 shows the dependence of the magnetization on magnetic field intensity applied for a thin film of Dy(40 Å)/Yb (40 Å) (25 periods of Dy-Yb layers).

FIG. 8 shows the effect of an external magnetic field on the magnetization of the thin film which were magnetized under a magnetic field of 2000 Gauss said external magnetic field applied in the direction opposite to the magnetization field. The ordinate denotes the perpendicular magnetization and the abscissa denotes the intensity of the external magnetic field applied. From this figure, it is clear that the thin film may preserve its magnetization even under the external magnetic field as high as 5000 Gauss in the opposite direction, verifying direction that such magnetic thin film has extremely strong resistance against external magnetic field.

Figure 9:
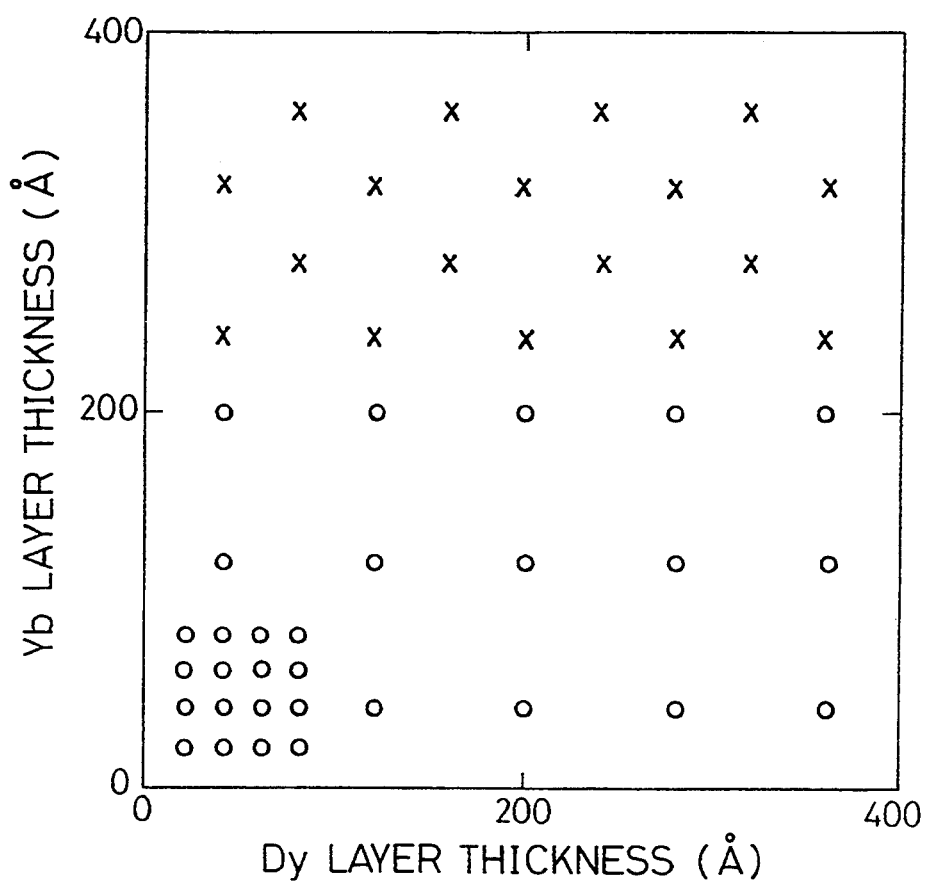
FIG. 9 illustrates, in terms of Dy and Yb thickness, the domain of Dy-Yb films where magnetic freezing may be observed.

FIG. 9 shows the results of the tests to find an allowable domain of the Dy- and Yb-thicknesses for the magnetic thin film to acquire frozen magnetization. The ordinate is the Yb layer thickness and the abscissa is the Dy layer thickness. Crosses denote samples exhibiting no frozen magnetization. Light circles denote samples exhibiting the frozen magnetization. The results show that the magnetic freezing is independent of the thickness of Dy layer, and that the thickness of Yb layer must not exceed 200 Å for the magnetic freezing to occur.

Figure 10:
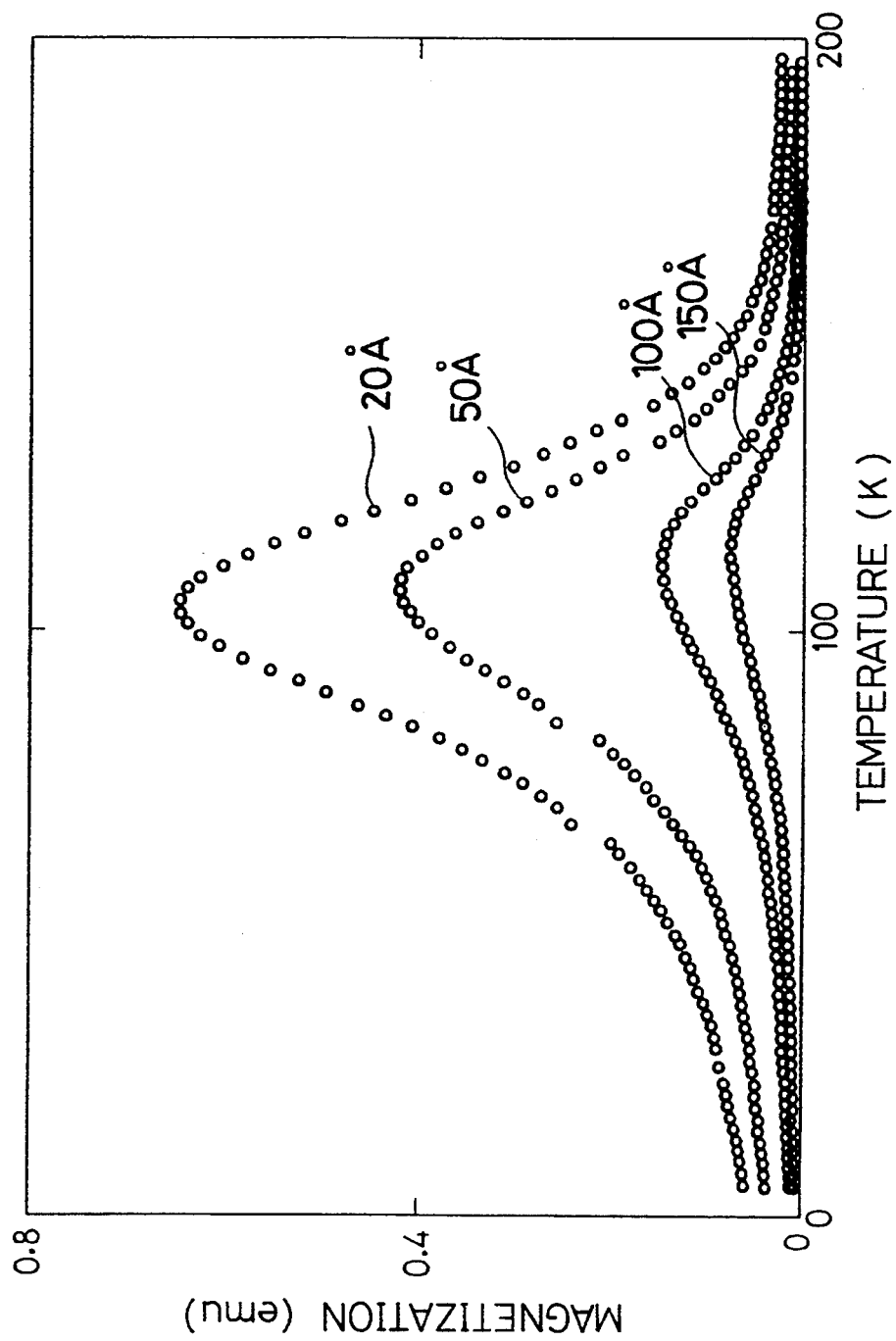
FIG. 10 shows the dependence of the magnetic freezing on Yb thickness of a Dy-Yb film (25 periods of Dy-Yb layers with Dy thickness of 40 Å).

FIG. 10 shows the temperature dependence of the magnetization of Dy-Yb thin films having different thicknesses. FIG. 10 verifies that magnetic freezing is enhanced as the thickness of the Yb layers is decreased. Thus, thin films having thin Yb layers are advantageous for magnetic recording. Since the stronger magnetic freezing appears in those films having thinner Yb layers, the magnetic freezing may be attributed to the Dy inter-layer magnetic interactions mediated by the conduction electrons. The disappearance of the frozen magnetic state in the thin films having thick Yb layers supports this view, since the disappearance would be attributed to the destruction of the inter-layer magnetic interactions by the thick Yb layers. It is thus anticipated that thin layers of electrically conductive material must exist in between the Dy layers in order to provide the thin film with frozen magnetization. This would be the case for any multi-layer magnetic thin films composed of other magnetic rare-earth metals and electrically conductive materials mentioned previously.

Figure 11A:
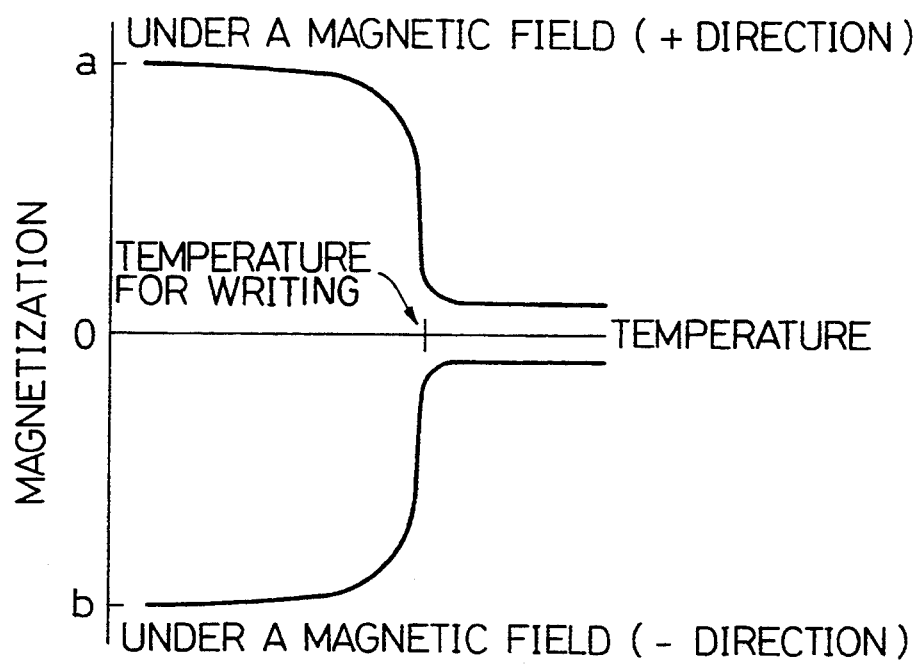
FIGS. 11A and 11B shows the possible magnetic states in conventional perpendicular magnetization and their Kerr rotational angles.
Figure 11B:
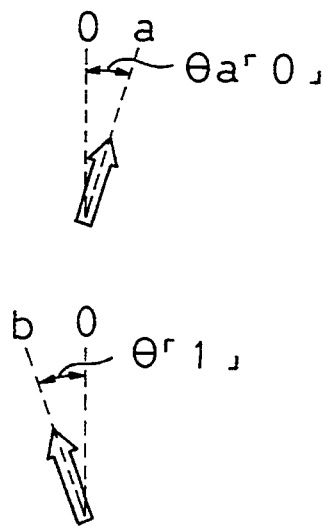

Referring now to FIGS. 11 and 12, a method for multiple recording is described. A conventional perpendicular magnetic recording medium has only two magnetic states "a" and "b" at a given temperature as shown in FIG. 11A, with "a" being the state obtained under a perpendicular magnetic field and "b" obtained under opposite perpendicular magnetic field. The states "a" and "b" may represent binary states "0" and "1", or vice versa, respectively, as shown in FIG. 11B. These magnetic; states may be read through observation of either the rotational angles $\theta a$ and $\theta b$ associated with them in Kerr effect or Faraday effect.

In contrast, the magnetic thin film of this invention may have more than two magnetic states, depending on the recording temperatures. In FIG. 12A are shown two different recording temperatures $T_1$ and $T_2$ for inducing four magnetic states "a'", "b'", "c'", and "d'", which correspond, respectively, to four different Kerr rotational angles shown in FIG. 12B, and may represent distinct quadri-states "00", "10", "01", and "11". Therefore, the magnetic medium shown in the figure may provide doubly multiple recording of information as compared with conventional one. The Kerr rotational angle $\theta a'$ for "a'" state was measured to be 2 degrees under an exemplary experiment, and the maximum angular difference between "a'" state and "d'" state amounted to 4 degree, which is far greater than the value of 1 degree for conventional magnetic media, so that the magnetic medium of this invention may provide sufficient S/N ratio. It is not difficult to extend the number of the states to 8 even with current measurement techniques which are widely used. Such 8 states may provide triplet information.

It should be noted that the magneto-optical recording medium according to the invention is not limited to the Dy-Yb multi-layer thin film described above, but may be extended to include multi-layer thin films of any magnetic rare-earth thin films interlaced with conductive metal layers, since the magnetic freezing, which is favorable for magneti-optical recording, is attributed to the magnetic inter-layer interaction between rare-earth metal layers.

The multi-layered magnetic thin film according to the invention may be manufactured economically using rare-earth metals such as Dy, without using expensive metals like Tb (Terbium). Such magnetic thin film having anisotropic perpendicular magnetization property along with the magnetic freezing property, allows multiple and high density magneto-optical recording using a controlled beam of laser light if one chooses suitable heating temperatures.

I claim:

1. A magneto-optical method for recording more than two discrete degrees of magnetization comprising the steps of:
   providing a magneto-optical recording medium having a substrate on which is placed alternate layers of a magnetic rare-earth metal and an electrically conductive material,
   applying a magnetic field substantially perpendicular to the surface of said medium,
   providing a laser for producing energy at a selected power output level, and
   irradiating the medium with a beam of energy from the laser of a selected power level to heat said medium in the presence of said magnetic field from a cooled state to one of a corresponding plurality of selected temperatures in a given temperature range to magnetize the medium from a magnetic frozen state to a corresponding selected one of more than two different degrees of magnetization of the ferromagnetic state, each such discrete degree of magnetization corresponding to a predetermined one of a plurality of digital values.

2. A magneto-optical method according to claim 1, wherein the recording medium has different magnetic states corresponding to different degrees of magnetization each having a respective Kerr rotational angle corresponding to a digital value, the various degrees of magnetization of the medium produced by heating with the laser energy of selected power each having one of said predetermined Kerr rotation angles which corresponds to a digital value.

3. A magneto-optical method according to claim 1 wherein the recording medium has an interlayer interaction due to conduction electrons in neighboring layers of the rare-earth metals.

4. A magneto-optical method according to claim 1 wherein the laser produces energy of substantially the same wavelength at all levels of power output.

5. A magneto-optical method according to claim 2 wherein the recording medium has an interlayer interaction due to conduction electrons in neighboring layers of the rare-earth metals.

6. The method of claim 1 further comprising the step of reversing the direction of the magnetic field applied to the recording medium.

7. A system for recording more than two discrete degrees of magnetization comprising:
   a magneto-optical recording medium having a substrate with alternate layers of a magnetic rare-earth metal and an electrically conductive material capable of being selectively magnetized to more than two different degrees of magnetization, each degree of magnetization corresponding to a different level of heating of the recording medium, each said different degree of magnetization corresponding to a different digital value,
   means for applying a magnetic field substantially perpendicular to the surface of said medium,
   a variable output power laser for producing energy which irradiates and heats the recording medium, and means for operating the laser to produce selected levels of power each to produce a level of heating of the magnetic material corresponding to one of the degrees of magnetization to record a corresponding different digital value.

8. The system of claim 7 wherein the recording medium at each different degree of magnetization has a respective Kerr rotational angle which corresponds to a digital value.

* * * * *